Jan. 17, 1956  C. E. MYERS  2,730,857
WEED-CUTTING ATTACHMENT FOR LAWN MOWERS
Filed Oct. 6, 1954  2 Sheets-Sheet 1
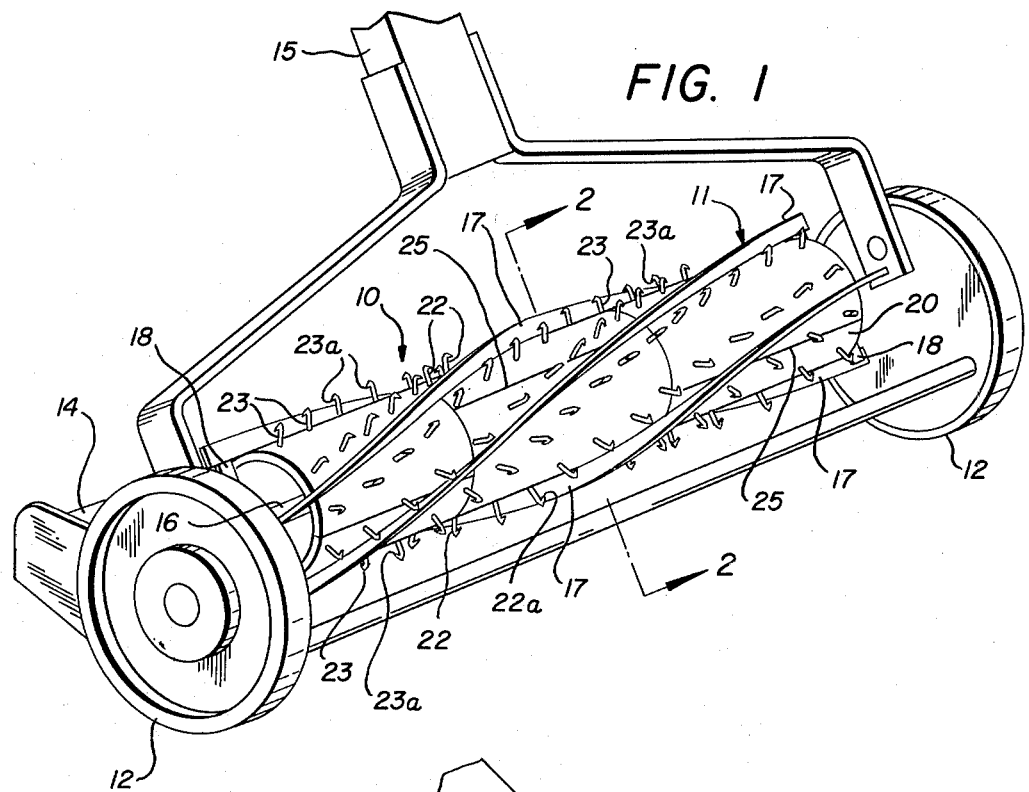
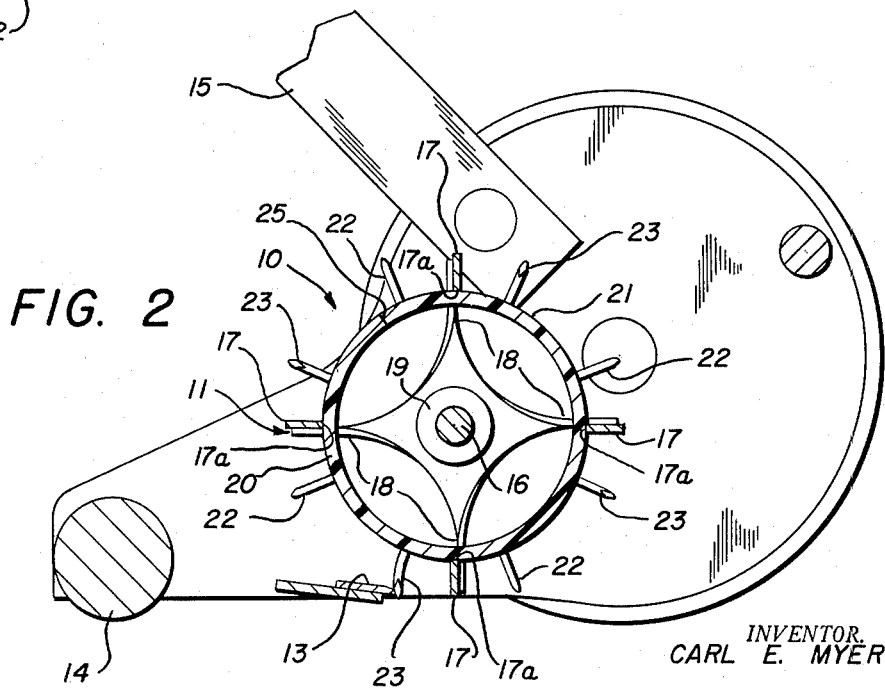
INVENTOR.
CARL E. MYERS
BY
J. William Freeman
ATTORNEY Jan. 17, 1956                C. E. MYERS                2,730,857
                  WEED-CUTTING ATTACHMENT FOR LAWN MOWERS
Filed Oct. 6, 1954                                  2 Sheets-Sheet 2
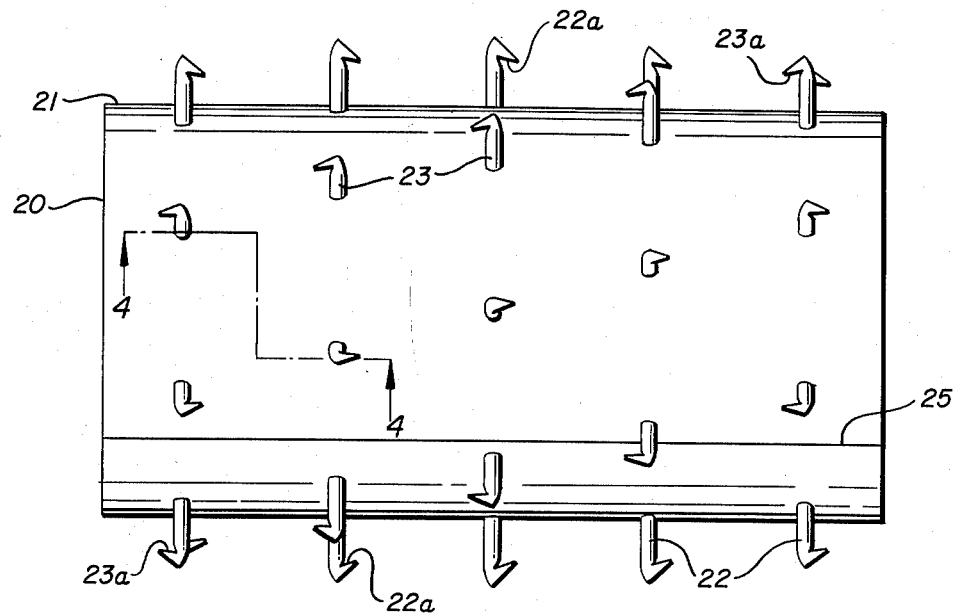
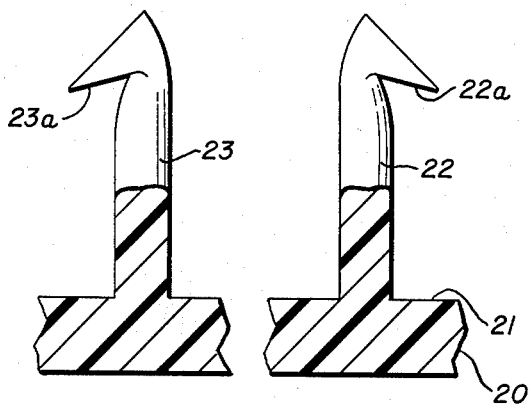
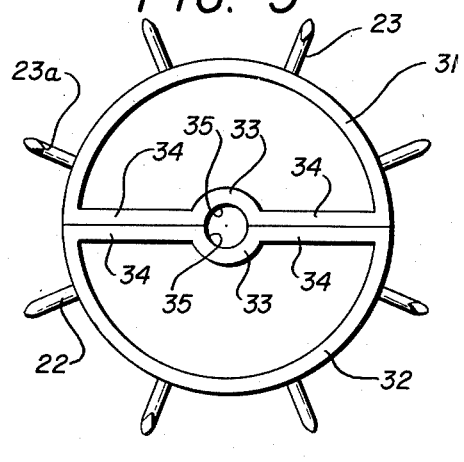
INVENTOR.
CARL E. MYERS
BY
ATTORNEY ly been designated as 10, includes, in essence, a
United States Patent Office 2,730,857
Patented Jan. 17, 1956

2,730,857
WEED-CUTTING ATTACHMENT FOR LAWN MOWERS

Carl E. Myers, Akron, Ohio

Application October 6, 1954, Serial No. 460,597

11 Claims. (Cl. 56—249)

This invention relates to lawn mowers, and in particular, relates to an improved weed-cutting attachment for reel type lawn mowers.

While the known prior art has advanced several forms of reel type lawn mowers over the past several years, the conventional reel type lawn mower generally includes a rotating cutting reel that cooperatively engages a relatively stationary cutting knife to effectuate a severance of grass gathered against the cutting bar.

In the earlier forms of reel type lawn mowers the cutting blades of the relatively rotating reel member were disposed in parallel with the axis of the cutting reel, and the entire advancing blade engaged the stationary cutting knife at the same time. Later improvements in reel type lawn mowers have modified the construction of the rotating cutting reel to some extent, in that the cutting blades are now provided in a spiral about the axis of the cutting reel so that portions of the same progressively engage the stationary cutting bar upon revolution of the cutting reel with respect thereto.

While the known prior art devices that have just been described are operable to satisfactorily cut the usual grass of a lawn, it has been found that the same are inoperative with regard to their ability to cut and trim certain types of weeds that are invariably present in a lawn. First and foremost of the weeds that are not capable of being cut by the known prior art reel type lawn mowers, is that type of weed conventionally known as "crab grass." This type of weed, by peculiarity of nature, does not grow vertically during its growth period, but rather extends along the ground with the end result that the same never reaches a sufficient height to be cut by a conventional reel type lawn mower.

The second general type of weed that the conventional reel type lawn mower is incapable of cutting is that type of weed known as a narrow leaf plantain. The plantain weed has a central spike that is characterized by an extremely rapid vertical growth, that causes the same to reach a height of four or five inches in a matter of a few days. The inability of the conventional reel type lawn mower to cut or trim this last mentioned type of weed results from the fact that the spikes are prematurely engaged by the interconnecting rods of the conventional reel type lawn mower and are accordingly bent over into a condition of parallelism with the ground, at which time the same do not come in contact with the usual stationary knife, and thus cannot be severed by the action of the cutting blades advancing thereagainst.

From the foregoing it is manifest that the inability of reel type lawn mowers to cut certain types of weeds results from the failure of the conventional cutter knife or bar thereof, to gather in these weeds that fall below the plane of the same as the lawn mower advances.

Accordingly, it is one object of this invention to provide an attachment for reel type lawn mowers that will satisfactorily trim the above type of weeds.

It is a further object of this invention to provide a weed cutting attachment for reel type lawn mowers that is of simplified construction that accordingly results in extreme economy of manufacture.

It is a still further object of this invention to provide a weed cutting attachment for conventional reel type lawn mowers that is characterized by the extreme simplicity by which the same may be positioned and removed with respect to the reel type lawn mower.

It is a still further object of this invention to provide a weed cutting attachment for reel type lawn mowers that will operate to gather against the cutter bar, certain low-lying types of weeds that normally lie below the plane of the advancing cutter bar.

These and other objects of the invention will become more apparent upon a reading of the following brief specification, considered and interpreted in the light of the accompanying drawings.

Of the drawings:

Figure 1 is a perspective view illustrating the improved weed cutting attachment in conjunction with a conventional reel type lawn mower.

Figure 2 is an enlarged side elevation partly broken away and in section taken on the lines 2—2 of Figure 1.

Figure 3 is an enlarged side elevation of the improved weed cutting attachment.

Figure 4 is an enlarged cross section of a segment of the improved weed cutting attachment.

Figure 5 is an end view of a modified form of the invention.

Referring now to the drawings, and in particular, to Figures 1 and 2 thereof, the improved weed cutting attachment, generally designated as 10, is shown positioned interiorly of the cutting reel 11, of a diagrammatically illustrated reel type lawn mower that includes wheels 12, 12, a stationary cutter bar 13, a roller 14, and a handle 15, all of which are of conventional construction and are assembled with respect to each other in known manner.

Referring now to Figure 2 where the representative cutting reel 11 is illustrated, it will be noted that the same (cutting reel 11) includes a rotary shaft 16 that has the opposed ends thereof fixed with respect to the stationary disc of the conventional wheels 12, 12 in known manner. The cutting blades 17, 17 of the cutting reel 11, are illustrated as being radially spaced with respect to the rotary shaft 16, through the medium of one or more spider members 18, the arrangement being such that the hub 19 of the spider surrounds the rotary shaft 16, while the radially-outwardly presented arms of the spider 18 are secured to the cutter blades 17, 17 in known manner (see Figure 2).

As has been previously indicated, the cutting blades 17, 17, are spirally fluted about the axis defined by the rotary shaft 16 and accordingly, it is apparent that the number and positioning of the spiders 18 may be varied in accordance with the particular requirements of the individual manufacturer. Accordingly, the spider members 18 may be employed only at the extreme axial ends of the rotary shaft 16, or if desired, additional spiders may be interposed between these axial ends to give additional support to the cutting blades 17. By like token, the cutter bar 13, which is inter-connected between the radially extending flanges of the wheels 12, 12, may be provided with adjustment features in a manner well understood in the prior art, and the construction of the cutter bar 13, as well as the construction of the cutting reel 11, is not claimed as a part of this invention.

The improved weed cutting attachment, that has generally been designated as 10, includes, in essence, a cylindrical sleeve 20, of resilient material that possesses inherent recovery properties. The radial dimension of the sleeve is such that the external periphery 21 of the same is substantially equal in diameter to the diameter of the cutter blades 17, 17, as defined by the inner edges 17a, 17a thereof. This construction results in a resilient sleeve that is received interiorly of the cutting blades 17, 17 for rotation therewith upon movement of the lawn mower.

For the purpose of gathering in weeds of the character described in accordance with the teachings of this invention, the external surface 21 of the cylindrical sleeve 20, is provided with a plurality of hook members 22, 22 and 23, 23, that are arranged to extend radially outwardly from the external surface 21 of the cylindrical sleeve 20. In the drawings, these hook members are illustrated as constituting an integral part of the sleeve 20, and are further illustrated as being arranged in spiralled sequence around the external periphery of the sleeve 20, with one series of hook members 22, 22 being adjacent to an equivalent series of hook members 23, 23. In this manner, a set of hook members 22, 22 will first engage the cutter bar 13, and further rotation of the reel 11 will result in the adjacent series of hook members 23, 23 being brought into contact with the cutter bar 13. As is apparent from an examination of Figures 3 and 4 of the drawings, all of the hook members are of equivalent construction, with the exception that the hook ends 22a, 22a of hook members 22, 22 extend to the right of Figure 3, while the hook ends 23a, 23a of the hook members 23, 23 extend in opposite direction towards the left of Figure 3. In this manner, oppositely disposed hook ends are provided for the purpose of insuring that complete gathering in of the weed material will be effectuated. It is, of course, manifest in this regard, that the respective hook members may be staggered longitudinally along the axis of the sleeve 20.

In the drawings, the hook members 22, 22 and 23, 23 are further illustrated as being of a radial length substantially equivalent to the radial projection of the cutter blades 17, 17. However, in this regard, it is manifest that the radial projection of the respective hook members may be increased so that the same will extend radially outwardly beyond the arc defined by the outer edge of the cutter blades 17, 17. In such a case, the inherent recovery properties of the hook members would permit the same to be bent slightly (see Figure 2) for permitting passage of the same past the cutter bar 13. By like token, the cylindrical sleeve is illustrated as being longitudinally slit as at 25, to permit the same to be spread apart for reception about the rotary shaft 16.

In use or operation of the improved weed cutting attachment 10, in conjunction with the conventional reel type lawn mower illustrated in Figures 1 and 2 of the drawings, the user first collapses the cylindrical sleeve 20 so as to separate the free ends thereof as defined by the slit 25. With the collapsed cylindrical sleeve 20 thus separated, the same may be inserted between the adjacent cutting blades 17, 17, with the free ends thereof being passed about the rotary shaft 16. With the collapsed sleeve thus positioned interiorly of the reel 11 as just described, the collapsing pressure may be withdrawn, and the cylindrical sleeve 20, by virtue of its inherent resiliency, will assume substantially the shape illustrated in Figure 2 of the drawings. In this condition, the external surface 21 of the same will abut the undersides 17a, 17a of the cutting blades 17, 17, and accordingly, the sleeve 20 and blades 17, 17 will rotate in unison about the axis of the shaft 16 upon rotation of the reel 11.

During the operation of the improved weed cutting attachment in conjunction with the conventional reel type lawn mower illustrated in Figures 1 and 2 of the drawings, it is manifest that rotation of the reel 11 will result in the cutter bar 13 being successively engaged by hook members 22, 22, hook members 23, 23, and blade 17, with this just described sequence of contact being subsequently repeated upon rotational advancement of the cutting reel 11. Accordingly, in Figure 2 of the drawings, the hook member 22 is shown srtiking the cutting bar 13, while the cutting blade 17, that is arcuately spaced with respect to the hook member 22, is shown as approaching its point of contact with the cutter bar. In this position, the hook member 22 is illustrated as having gathered in a blade of weed material at its hook end 22a, thereof so as to lay the same against the knife edge of the cutter bar 13, so that the same may be trimmed by the rotationally advancing cutting blade 17 upon further rotational advancement of the cutting reel 11. Additionally, it is to be noted at this point, that the hook member 22 is shown as being slightly bent by the cutter bar 13 so that the same is permitted to pass by the cutter bar 13. With further reference now to Figure 2, it will be seen that the hook members 23, 23 are arcuately spaced so that the same will be engaging flat growing weed members, and upon further rotation, the same will carry these gathered weeds into contact with the cutter bar 13, whereupon the weeds will be severed at such time as the next advancing cutter bar 17 comes into contact with the cutter bar 13. It is apparent that each time a hook member 22, 22, or 23, 23 passes the cutter bar 13, the same will lay thereagainst any weed material gathered in during the preceding period of revolution, so that these weed materials may be severed by the successively advancing cutter blades 17, 17 in the usual manner.

After the user has completed the mowing of the lawn, or at such time as is desired, the weed cutting attachment 10 may be simply and easily removed from its position interiorly of the cutting reel 11, by merely collapsing the same and withdrawing the collapsed sleeve 20 between the blades 17, 17 in a similar manner to the method in which the same was inserted. At this time, the weed cutting attachment may be stored until such time as it is again needed, at which time the same may be easily and simply reinserted interiorly of the cutting reel in the manner previously described.

It will be seen in the preceding paragraphs that there has been provided a new and novel weed cutting attachment for reel type lawn mowers that permits the same to cut and thereby effectively eliminate certain types of low growing weed material that is normally not capable of being cut by the conventional lawn mower of this type. It has been further illustrated how the collapsible nature of the cylindrical sleeve permits the easy and quick insertion and removal of the same with respect to the usual cutting reel, and further, how the inherent resiliency of the material employed in conjunction with the cylindrical sleeve 20 and the integral hook elements thereof, facilitates the overall utility thereof with respect to the insertion and removal, as well as the increased efficiency in the cutting operation.

In Figure 5 of the drawings, there is illustrated a modified form of the invention that is similar in principle and operation to the device of Figures 1 to 4 of the drawings, with the single exception that the cylindrical sleeve of the same is shown as being of two-piece construction. Accordingly, where indicated, like parts designate like numerals.

To this end the modified weed cutting attachment of Figure 5 is shown as including a cylindrical sleeve 20 that is received interiorly of the reel 11 in similar fashion to the manner in which the sleeve 20 is inserted in Figures 1 to 4, and is further defined by a pair of complemental semi-hemispherical cylindrical members that are generally designated as 31 and 32.

Each semi-hemispherical member 31 and 32 is shown as including an arcuate wall segment 33 that is interconnected at spaced ends thereof by a longitudinally extending wall member 34, 34. For the purpose of permitting the semi-hemispherical members 31, 32, respectively, to be received about the conventional rotary shaft 16, the straight walls 34, 34 thereof are shown offset by cylindrical radii 35, 35 that abut about the rotary shaft 16.

In use or operation of this modified form of the invention, each semi-hemispherical member 31 and 32, respectively, is individually inserted and positioned so that the external arcuate wall segment 33 thereof abuts the underside of the blade 17, while the radius 35 of wall 34 surrounds the rotary shaft 16. With both semi-hemispherical members 31 and 32 installed interiorly of the cutting wheel 11, it is manifest that the operation of the weed cutting attachment will be similar in every respect to that described in connection with Figures 1 and 4 of the drawings, and accordingly, the hook members 22 and 23 that are provided on semi-hemispherical members 31 and 32 will engage and carry weed members into engagement with the cutting bar 13 in a similar manner. By like token, removal of the individual members 31 and 32 from the interior of the cutting reel 11 may be easily and simply effectuated by collapsing thereof and individually removing each member.

It follows, from the preceding paragraphs that other modifications of similar scope could be resorted to without the exercise of invention. For example, in each case, the axial length of the collapsible sleeve is determined by the spacing between the spider members provided on the cutting reel. By like token, the external diameter of the cylindrical sleeve will be determined by the diameter defined by the undersides 17a, 17a of the cutting blades 17, 17. Additionally, in that form of reel type lawn mower where no center shaft is employed in conjunction with the cutting reel 11, it is manifest that the cylindrical sleeve could be provided so as to omit the longitudinal slit 25 previously described, in which case the cylindrical sleeve 20 would merely be deformed and positioned interiorly of the reel 11.

Accordingly, other modifications of the invention may be resorted to without departing from the spirit thereof or the scope of the appended claims.

What is claimed is:

1. A weed cutting attachment operable interiorly of the cutting reel of a reel type lawn mower of the character described, comprising; a hollow cylindrical body receivable interiorly of said cutting reel for rotation therewith; and a plurality of weed-engaging members extending radially outwardly from the external surface of said cylindrical body; the wall sections of said cylindrical body having inherent recovery properties whereby said cylindrical body may be collapsed.

2. A weed cutting attachment operable interiorly of the cutting reel of a reel type lawn mower of the character described, comprising; a hollow cylindrical body receivable interiorly of said cutting reel for rotation therewith; and a plurality of weed-engaging members extending radially outwardly from the external surface of said cylindrical body; the wall sections of said cylindrical body having inherent recovery properties whereby said cylindrical body may be collapsed; said weed-engaging members being arranged in arcuately adjacent, longitudinally extending rows around the external surface of said cylindrical body.

3. The device of claim 2 further characterized by the fact that said arcuately adjacent, longitudinally extending rows of weed-engaging members extend longitudinally of said cylindrical body in helical arrangement.

4. The device of claim 2 further characterized by the fact that at least one row of said weed-engaging members are provided with hook members that extend axially of said cylindrical body in one direction, while at least one other row of said weed-engaging members are provided with hook members extending axially of said cylindrical body in an opposite direction to said first mentioned row of weed-engaging members.

5. The device of claim 2 further characterized by the fact that said weed-engaging members in at least two adjacent rows, are staggered axially of said cylindrical body.

6. A weed cutting attachment operable interiorly of the cutting reel of a reel type lawn mower of the character described, comprising; a hollow cylindrical body receivable interiorly of said cutting reel for rotation therewith; a plurality of weed-engaging members extending radially outwardly from the external surface of said cylindrical body; and means for longitudinally separating at least one longitudinal wall section of said cylindrical body, whereby the same may be positioned interiorly of said cutting reel.

7. A weed cutting attachment operable interiorly of the cutting reel of a reel type lawn mower of the character described, comprising; a hollow cylindrical body receivable interiorly of said cutting reel for rotation therewith; a plurality of weed-engaging members extending radially outwardly from the external surface of said cylindrical body; and means for longitudinally separating at least one longitudinal wall section of said cylindrical body, whereby the same may be positioned interiorly of said cutting reel; said means including a longitudinal slit in the wall section of said cylindrical body.

8. A weed cutting attachment operable interiorly of the cutting reel of a reel type lawn mower of the character described, comprising; a hollow cylindrical body receivable interiorly of said cutting reel for rotation therewith; a plurality of weed-engaging members extending radially outwardly from the external surface of said cylindrical body; and means for longitudinally separating at least one longitudinal wall section of said cylindrical body, whereby the same may be positioned interiorly of said cutting reel; said means including a pair of longitudinally complemental, semi-hemispherical, wall sections, the free ends of which are inter-connected by a straight wall section.

9. The device of claim 8 further characterized by the fact that said straight wall sections are offset centrally thereof to define a radial wall segment.

10. In combination with a reel type lawn mower having a cutting reel defined by a plurality of longitudinally extending cutting blades; a weed cutting attachment, including a collapsible sleeve received interiorly of said cutting reel for rotation therewith and having the external diameter thereof approximating the internal diameter of said cutting reel as defined by the radially inward edge portion of said cutting blades; and a plurality of integral weed-engaging members extending radially outwardly from the external surface of said sleeve; said weed-engaging members having hook means on the freely presented ends thereof.

11. The device of claim 10 further characterized by the fact that the radial projections of said hook members approximate the radial projection of said blades, whereby the weed-engaging members and the outer radial edge portions of said cutting blades move in the same arcuate path upon rotation of said cutting reel.

No references cited.